United States Patent [19]

Harre et al.

[11] 4,101,087
[45] Jul. 18, 1978

[54] BRAKING DEVICE IN A NON-ROTARY TYPE FISHING REEL

[75] Inventors: Kurt Johan Stausgaard Harre, Karlshamn; Kenth Anker Thufvesson, Asarum, both of Sweden

[73] Assignee: ABU Aktiebolag, Svangsta, Sweden

[21] Appl. No.: 701,962

[22] Filed: Jul. 1, 1976

[30] Foreign Application Priority Data

Jul. 7, 1975 [SE] Sweden .................................. 7507747

[51] Int. Cl.² ...................... A01K 89/01; A01K 89/02
[52] U.S. Cl. .............................. 242/84.2 A; 242/84.53
[58] Field of Search .................. 242/84.2 A, 84.21 A, 242/84.21 R, 84.5 R, 84.51 R, 84.53

[56] References Cited

U.S. PATENT DOCUMENTS

| | | | |
|---|---|---|---|
| 1,580,986 | 4/1926 | Aberson | 242/84.5 R |
| 2,544,962 | 3/1951 | Legg | 242/84.53 |
| 2,656,993 | 10/1953 | Dukes | 242/84.53 |
| 2,918,227 | 12/1959 | Mauborgne | 242/84.21 R |
| 2,988,298 | 6/1961 | Purnell | 242/84.2 A X |
| 3,034,741 | 5/1962 | Macy et al. | 242/84.2 A |
| 3,108,760 | 10/1963 | Nurmse | 242/84.2 A |
| 3,248,819 | 5/1966 | Stealy | 242/84.2 A |
| 3,255,981 | 6/1966 | Wood, Jr. | 242/84.21 R X |

*Primary Examiner*—Billy S. Taylor
*Attorney, Agent, or Firm*—Karl W. Flocks

[57] ABSTRACT

This invention relates to an easily thumb operated braking device of a fishing reel of the type having a line spool which is non-rotary during casting. The braking device comprises a thumb operated braking knob pivotally mounted at the rear of a gear housing supported by a reel frame or base behind the line spool, said braking knob having a braking member extending into the housing and adapted to be moved, when the braking knob is operated, into braking engagement with a surface of revolution rotatably driven by a gear connected between the hand crank of the reel and a line winding member.

10 Claims, 13 Drawing Figures

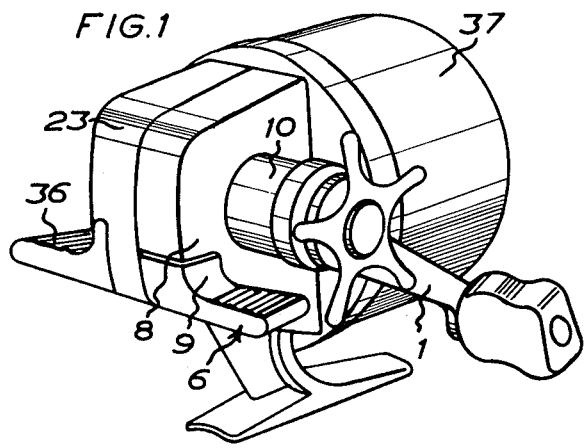
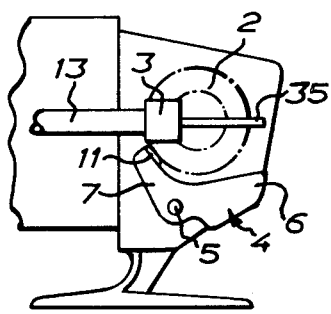
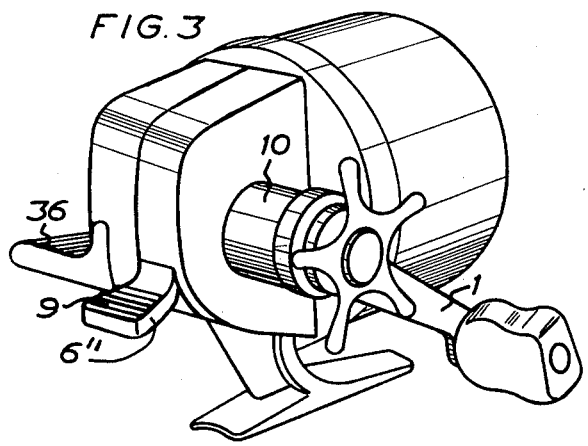
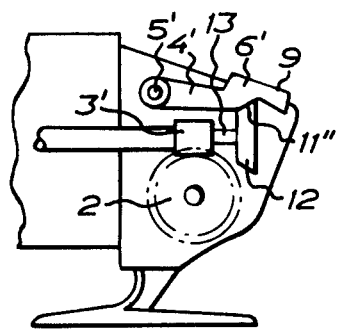
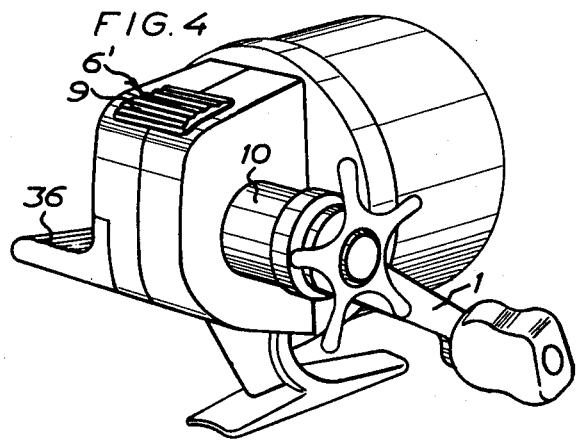
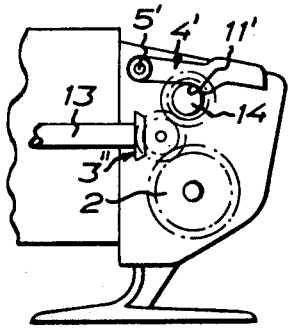

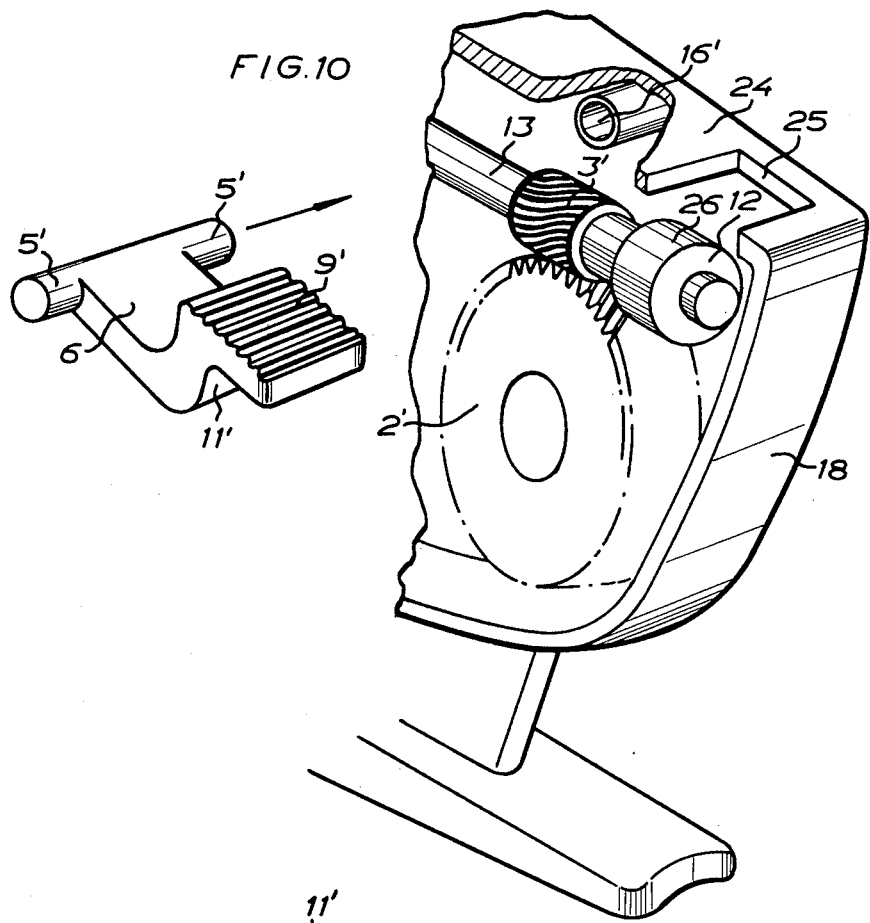
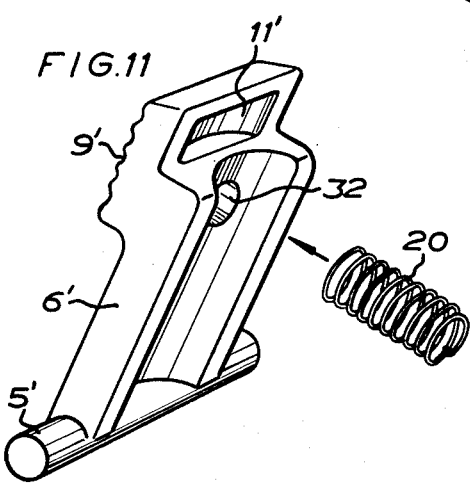

BRAKING DEVICE IN A NON-ROTARY TYPE FISHING REEL

The present invention relates to braking device of a fishing reel of the type which comprises a rotatable line winding member and a transmission between the crank and the line winding member.

A problem with conventional frictional brakes for non-rotary type reels resides in the difficulty of rapidly and exactly controlling the braking force during, for instance, the playing of the fish, and especially the gaffing of the fish, when one has to leave hold of the crank, is a critical moment during which the fish can pull out the line and free itself.

Non-rotary reels of a certain type are usually provided with a braking knob placed at the rear of the reel, said knob being operated by the thumb and acting on the rear end of a shaft whose forward end carries a soft braking cone which, when pressed by means of the braking knob, is pushed forwards and urges the line up against a stationary cap provided on the reel housing. This arrangement is intended to retain the line during casting and is not apt to brake the line when playing the fish. Reels of this type therefore usually also are provided with a presettable friction mechanism which acts directly upon the crank. The transmission of force from the crank to the crank shaft, and vice versa, is determined by the preset friction mechanism. The presetting device for the friction mechanism is a rule placed between the crank and the reel so that it can be easily operated without making it necessary to leave hold of the crank handle, but if the crank handle is released, the line may be pulled out practically without hindrance.

According to another previously known design for so-called open non-rotary type reels having a line winding member in the form of a stirrup, the reel is provided at its rear with a frictional brake including an adjustment wheel which can be preset to act upon the spool shaft with a selected braking moment. If the pull at the line exceeds the braking moment, the spool will be rotated by the line if the stirrup is retained by means of the crank mechanism.

Common to these devices is the fact that they do not overcome the difficulties which arise when the crank is left hold of and a fishing is to be gaffed. At that moment the fish can pull out the line and then the fisherman may lose the fish before he has got time to regain control of the development by catching the crank.

The object of the invention is to provide an efficient braking device which is independent of the crank and the spool shaft and permits braking with controlled force by pressure being exerted on a braking knob at the rear of the reel where it is easily accessible to the thumb of the "rod hand".

This object is achieved by the present invention wherein the braking device includes a braking knob pivotally mounted at the rear of a gear housing supported by a reel frame and having a braking member which extends into the housing and is adapted to be moved, when the braking is operated, into engagement with a surface of revolution driven by the gear transmission to effect braking with a force which is controllable by pressure being exerted on the braking knob.

Other characteristic features and advantages of the invention will become apparent from the following description and claims.

The braking device of this invention permits braking with controlled force exerted by the thumb of the hand holding the rod, both when the fish rushes and when the fish is being gaffed and thus also when it is necessary to let the crank loose or when the crank must be moved backwards to act upon the line winding member.

The invention will be described in more detail below by way of example, reference being made to the accompanying drawings, in which:

FIG. 1 is a schematic perspective view of a non-rotary type reel equipped with a braking device according to the invention;

FIG. 2 is a schematic view of the braking device according to a preferred embodiment of the invention;

FIG. 3 shows a modification of the braking knob in a braking device according to FIG. 2;

FIG. 4 shows a braking knob placed at the top of the housing;

FIGS. 5 and 6 show schematically two different embodiments of a braking knob according to FIG. 4;

Figure 7:
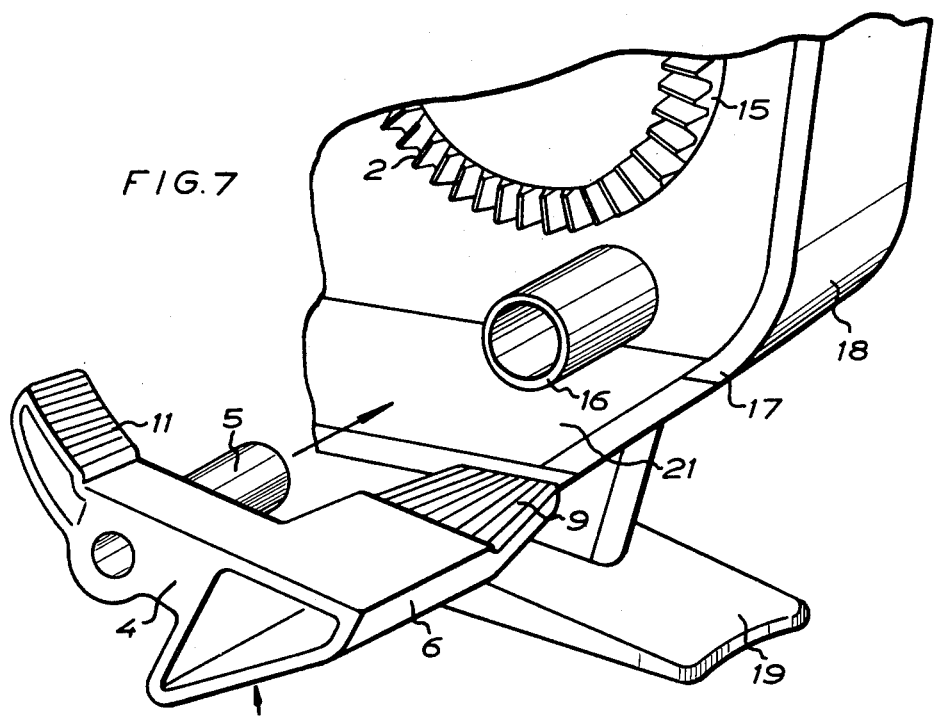
FIG. 7 is an exploded partly schematic perspective view showing details of the preferred braking device according to FIG. 2.
Figure 8:
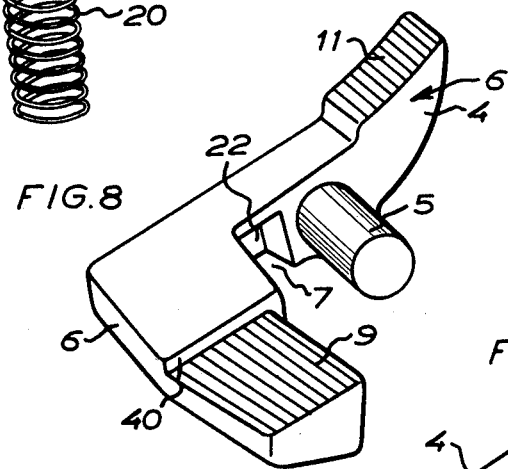
FIG. 8 shows the braking knob of FIG. 7 as seen from another side.
Figure 12:
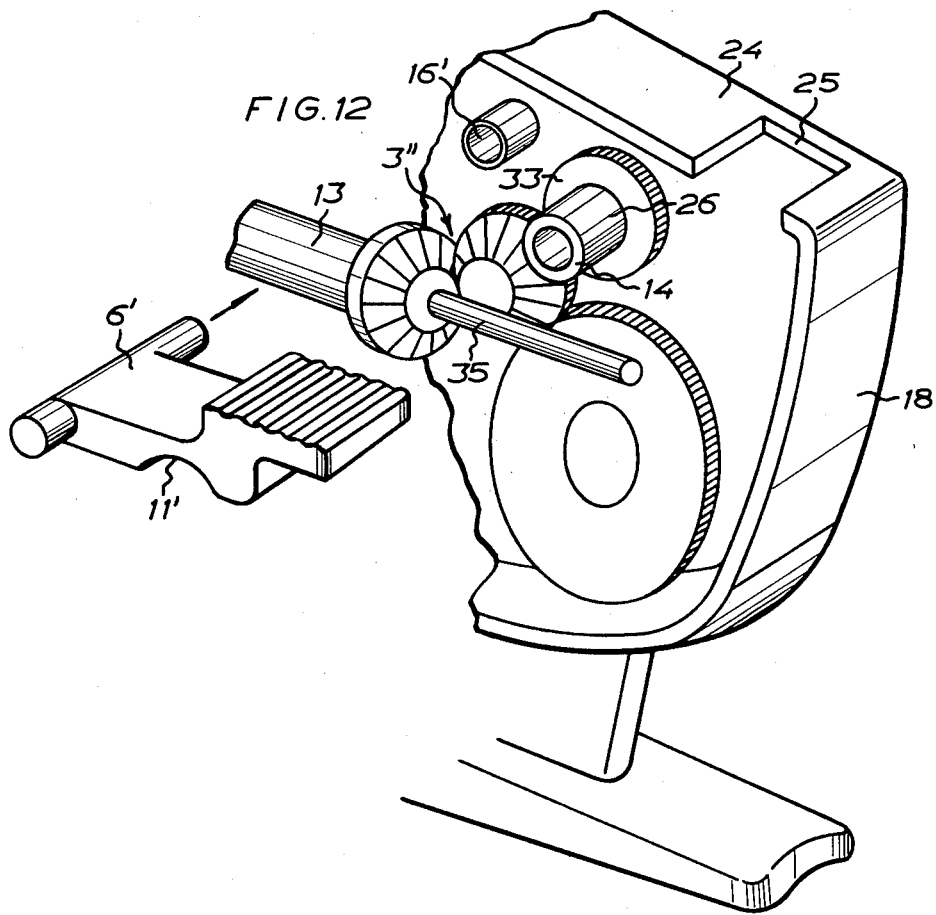
Figure 13:
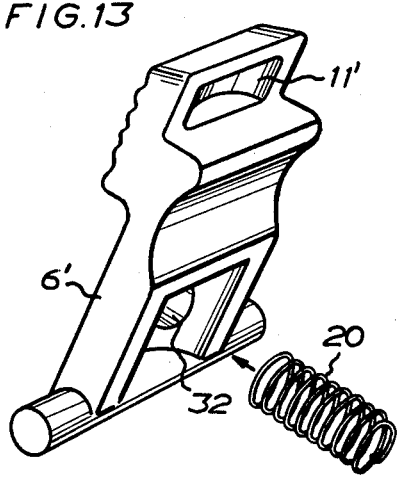

FIGS. 10 and 11 correspond to FIGS. 7 and 8 but show a modified embodiment according to FIG. 5; and FIGS. 12 and 13 correspond to FIGS. 10 and 11 but show a modified embodiment according to FIG. 6.

In the non-rotary type reels illustrated in the drawings the winding member of the reel is driven by the crank 1 via a gear transmission comprising a gear wheel 2 driven by the crank and a pinion 3 driven by the gear wheel 2 and carried on the shaft of the winding member. The gear wheel 2 has a ring of teeth on one side and a cylinder-shaped circumferential surface. The braking device of the invention includes, according to the embodiment of FIGS. 1–3, a braking knob forming part of a two-armed lever 4 which is pivotally mounted on a shaft 5 below the gear wheel 2. One arm of the two-armed lever 4 constitutes the braking knob 6 proper and its other arm forms a braking member 7 for braking against the circumferential surface of the gear wheel 2 when the braking knob 6 is presed downwards with respect to FIGS. 1–3.

According to the embodiment of FIG. 1 the lever 4 in its entirety is principally mounted beneath the gear wheel 2 in accordance with FIG. 2 and the braking knob 6 proper is placed at a low level and forms a lower corner section of the housing 8, the operating surface 9 of the braking knob being placed outside the right-hand end wall of the reel at the same side as the crank bearing 10. Further, according to the embodiment of FIG. 1, the braking knob 6 is placed inside the plane of the rear surface of the housing and forms part of this surface. According to this embodiment the braking knob is designed for operation by the thumb of the left hand. When operated for braking, the operating surface 9 of the braking knob moves generally downwards towards the longitudinal axis of the rod in the direction which is most suitable for the operating movement of the thumb. The braking knob 6 or its braking member 7 may contain a resilient section which is adapted to limit the braking force to a suitable upper level.

The embodiment shown in FIG. 3 substantially conforms with the embodiment of FIGS. 1 and 2 with the difference, however, that the braking knob 6" does not form any corner section of the housing (the right-hand end wall of the housing is left intact at this point) and that the operating surface of the braking knob is placed behind the rear surface of the housing. In this embodiment the braking knob can be operated optionally with the right or left hand thumb.

According to the embodiment of FIG. 4, the braking knob is placed above the gear wheel 2 and consequently in a relatively high position where it is arranged generally symmetrically on the top of the housing. As in the embodiment of FIG. 3, the braking knob may be operated optionally with the right or left hand thumb. The braking knob forms part of a one-armed lever 4' which is pivotally mounted on a shaft 5' (see FIGS. 5 and 6) in the housing over the gear wheel 2 and is provided with a braking surface 11' for braking against a braking disc 12 (FIG. 5) which is placed on the shaft 13 of the pinion 3', or (FIG. 6) against a braking drum 14 mounted separately in the housing and driven by the gear transmission.

The embodiment according to FIGS. 1 and 2 is shown in greater detail in FIG. 7 where the same reference numerals are used to designate the same elements as in FIGS. 1 and 2. The braking knob 6 in the form of a two-armed lever 4 has a pivot in the form of a journal 5 which, for providing a pivotable bearing for the braking knob, is insertable into a bearing sleeve 16 which projects from the inside of the housing and may be made in one piece with the housing by moulding. The entire braking knob 6, i.e. the two-armed lever with the knob part 6 proper and the braking member 7, and the bearing journal 5 preferably consist of plastics material and is provided with a grooved operating surface 9 and has a braking surface 11 of suitable configuration. FIG. 7 shows at 17 a recess for the braking knob in the rear bottom part of the housing, at 18 the rear lower surface of the housing and at 19 the foot of the housing. At 20 there is shown a spring which, when the braking knob has been mounted (with the journal 5 borne in the sleeve 16), is placed between the bottom part 21 of the housing and a recess 22 (FIG. 8) in the braking knob near the journal 5. Thus, in active position, the spring 20 tends to turn the braking knob and bring the braking surface 11 into free position relative to the peripheral surface 15 of the gear wheel 2.

As is apparent from FIGS. 7 and 8 the operating surface 9 of the braking knob is depressed and delimited relative to adjacent parts of the braking knob (the term "braking knob" is used here and henceforth to designate the entire member 4) by shouldered surfaces 40 which, when the braking knob is in the inactive position, will adjoin adjacent edges of the housing wall in a relatively tight manner.

The housing has a cover 23 (see FIG. 1) which can be disassembled and which is so arranged that, when the braking knob has been mounted in the housing and the cover itself has been mounted in position, it maintains the braking knob in the axial direction of the journal 5.

As has already be mentioned, the braking knob may be provided with a resilient section which, for example, may include the braking surface 11. The braking knob may for example, be formed so that the braking surface 11 will bear against the braking surface 15 of the gear wheel, before the braking knob, when turning to effect braking, has attained a position (possibly a stop position against the adjacent housing surface 21) in which maximum braking force has been established.

Figure 9:
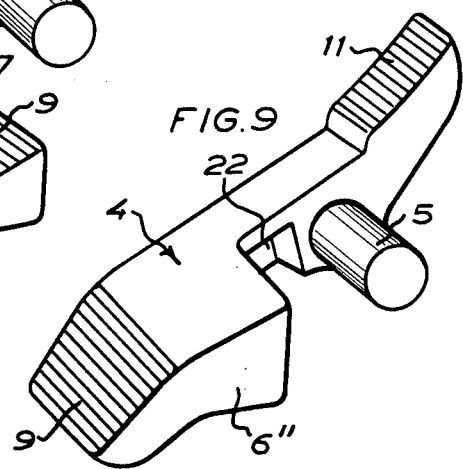
FIG. 9 shows a modified braking knob according to FIG. 3.

The braking knob 6" shown in FIG. 9 differs from the braking knob 6 of FIG. 8 only in that the operating surface 9 extends backwardly instead of laterally of the main part of the braking knob. Of course, also the recess in the housing is modified to conform with the configuration of the braking knob.

FIGS. 10 and 11 show in greater detail an embodiment corresponding to FIGS. 4 and 5, and FIGs. 12 and 13 show details of the embodiment of FIG. 6.

According to FIGS. 10, 11 the braking knob 6' is in the form of a one-armed lever having at one end two bearing journals 5' projecting in opposite directions and at the opposite end an operating surface 9'. The bearing journals 5' are designed to be mounted in two bearing sleeves 16' directed towards each other (only one of which is shown) in the housing the rear wall of which is shown at 18 and the upper wall of which at 24. The upper wall 24 has a recess 25 for the braking knob 6', and the braking knob has on its underside a braking surfacce 11' for braking against the circumferential surface 26 of the braking disc or drum 12 which is mounted on the shaft 13 carrying the pinion 3' driven by the gear wheel 2'.

FIG. 11 shows a spring 20 which, like the spring 20 according to the embodiment of FIGS. 7, 8, is to be placed between the braking knob and a housing wall (i.e. the inside of the wall 18 according to the embodiment of FIG. 10) when the knob has been mounted in position. The spring 20 engages with one end a recess 32 on the inside of the braking knob.

The braking knob may be provided, as in the described embodiment according to FIGS. 7 and 8, with a resilient section which yields until the braking knob reaches an inner end position in which maximum braking force has been obtained.

The arrangement according to FIGS. 12, 13 correspond in principle to the arrangement of FIGS. 10, 11 with the difference, however, that braking is effected against a braking drum 14 driven via a gear transmission 3". The braking drum can, if desired, be driven at another number of revolutions than the shaft 13, and according to a preferred embodiment the braking drum is formed integrally with the gear wheel 33 by means of which the drum is driven.

The details in FIGS. 12, 13 are, where applicable, designated by the same reference numerals as in FIGS. 10, 11.

As is apparent from the above description and as is readily understood from the drawings the braking knob in the braking device of the invention admits of infinitely variable braking of a rotary element and the braking knob is so arranged that it can be operated by the thumb of the hand holding the rod (which does not exclude that the braking knob may likewise be handled with the thumb of the other hand). The braking device according to the invention admits of controlling the braking whenever desired, as is the case for instance when the fish rushes, when gaffing the fish and when it is necessary to release hold of the crank or when the crank is to be moved backwardly.

The braking device according to the invention does not prevent using an operating member at the rear of the reel for braking the line via the spool shaft or for frictional braking of the spool shaft. Such a device may normally act upon a spool shaft 35, which is displaceable in the hollow shaft 13 (see FIG. 2), and may be operated by means of an operating knob 36 or wheel for displacing a braking cone towards the forward end of a cap 37 for ,amming the line between the braking cone and the cap or for preset braking action on the spool shaft.

The invention is not confined to the embodiments described above but may be modified in various ways within the scope of the following claims.

What we claim and desire to secure by Letters Patent is:

1. A braking device in a non-rotary type fishing reel having a transmission and comprising
    a hand crank and a line winding member,
    gear means located between said hand crank and said line winding member and including
        a face gear drivable by said hand crank having a substantially smooth peripheral friction surface of revolution and teeth on a side face,
        a pinion gear connected to said line winding member and positioned to engage said teeth of said face gear
    a gear housing supporting said gear means,
    a reel frame supporting said gear housing,
    a lever thumb-operated friction braking knob of the type of lever formed by a bar with its fulcrum between an area of thumb applied power on one side of said fulcrum and a frictional braking area on the other side of said fulcrum, pivotally mounted at the rear of said gear housing, and having an operating position including said area of thumb applied power extending exteriorly of said housing, and a braking portion including said frictional braking area extending into said housing, and located for moving said frictional braking area into contact with said peripheral friction surface of revolution to exert a braking moment on said peripheral surface of revolution proportional to the pressure exerted on said operating portion.

2. A braking device as claimed in claim 1, wherein said braking knob includes said operating portion which is arranged to be easily accessible to the thumb of the hand with which the fisherman holds a fishing rod.

3. A braking device as claimed in claim 2, wherein a crank bearing is connected to said crank and said operating portion of said braking knob is positioned at the same side of said housing as said crank bearing.

4. A braking device as claimed in claim 3, wherein said braking knob forms a lower corner part of the housing.

5. A braking device as claimed in claim 2, wherein the operating portion of said braking knob is positioned at the outside of said housing at the rear bottom part thereof.

6. A braking device as claimed in claim 2, wherein said braking knob is adapted when actuated for braking to pivot in the direction of the centre line of a fishing rod, the movement of said braking knob operating portion corresponding to the natural operting movement of the thumb of the hand with which the fisherman holds the rod.

7. A braking device as claimed in claim 1, wherein said braking knob is placed in a recess in said housing and provided with shouldered surfaces which, when the knob is in inactive position, will adjoin in a substantially tight manner surfaces defining the recess.

8. A braking device as claimed in claim 2, wherein said braking knob is so arranged that, when operated for braking, its operating portion moves in said direction out of the housing.

9. A braking device as claimed in claim 1, wherein said braking knob has said operting portion outside the right-hand side of said housing, said operating portion being placed at the rear bottom corner of said housing at said side.

10. A braking device as claimed in claim 1, further including a rear surface on said braking knob forming an extension of a rear surface on said housing.

* * * * *